(12) United States Patent
Ericson et al.

(10) Patent No.: US 8,798,946 B2
(45) Date of Patent: Aug. 5, 2014

(54) METHOD AND ARRANGEMENT FOR A DIGITAL SUBSCRIBER LINE

(75) Inventors: Klas Ericson, Alvsjo (SE); Roberto Menezes Rodrigues, Belem (BR); João C. Weyl Albuqerque Costa, Belem (BR); Aldebaro Klautau, Belem (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 13/060,928

(22) PCT Filed: Aug. 28, 2008

(86) PCT No.: PCT/EP2008/061273
§ 371 (c)(1),
(2), (4) Date: Feb. 25, 2011

(87) PCT Pub. No.: WO2010/022776
PCT Pub. Date: Mar. 4, 2010

(65) Prior Publication Data
US 2011/0161027 A1    Jun. 30, 2011

(51) Int. Cl.
*G01R 25/00* (2006.01)
*G01R 35/00* (2006.01)
*H04M 1/24* (2006.01)
*G01R 27/28* (2006.01)

(52) U.S. Cl.
USPC ............. 702/65; 702/109; 379/1.04; 324/615

(58) Field of Classification Search
USPC ................. 702/65, 57, 81, 84, 108–109, 127, 702/182–183, 188–189; 379/1.01, 379/1.03–1.04, 22.01, 24, 27.01, 379/27.03–27.04, 29.01, 30, 32.04; 375/220–221, 224; 324/600, 612, 615
See application file for complete search history.

(56) References Cited

PUBLICATIONS

P. Melsa and K. Jacobsen, "Single-Ended Loop Testing (SELT) Expectations and Realities" (Whitepaper), Broadband Communications Group, Texas Instruments, Mar. 2003.*
Rongpeng et al., "Single-Ended Loop Testing (SELT)—New Architecture", Electronic Measurement and Instruments, ICEMI '07, Eighth International Conference on Electronic Measurement and Instruments, IEEE, Aug. 1, 2007, pp. 3-917 to 3-922.*
Bazant A et al: "Signal Propagation Modeling in Power-Line Communication Networks", IEEE Transactions on Power Delivery, IEEE Service Center, New York, NY, US, vol. 20 No. 4, Oct. 1, 2005, XP011140047.

(Continued)

*Primary Examiner* — Toan Le

(57) ABSTRACT

The present invention relates to a method and an arrangement based on two-port network (TPN) theory that allows analytically estimating the loop transfer function from open and short-circuited input impedance measurements, e.g. single ended line transmission (SELT) measurements, by utilizing the fact that the line under test (LUT) can be considered reciprocal and by assuming that the LUT is symmetric. Hence, by using the present invention and an estimation of the noise on the line, the attainable bit rate at the customer premises can be determined by means of SELT measurements at the CO. The transfer function of a telephone copper-loop is estimated regardless of its topology by impedance measurements from the CO side. Specifically, such estimation is carried out from the calculation of the transmission parameters of loop, which are expressed only in terms of open and short-circuited input impedance measurements at the CO when reciprocity and symmetry is assumed.

8 Claims, 12 Drawing Sheets

(56) References Cited

PUBLICATIONS

Bostoen, et al. Estimation of the Transfer Function of a Subscriber Loop by Means of a One-Port Scattering Parameter Measurement at the Central Office IEEE Journal on Selected Areas in Communications, IEEE Service Center, Piscataway, US, vol. 20, No. 5, Jun. 1, 2002, XP011 065489 ISSN: 0733-8716.

* cited by examiner

Loop 1

CO──────────────────────────────────────CP
0.4 mm / 500 m

Loop 2

CO──────────────────────────────────────CP
0.5 mm / 1000 m

Loop 3

Loop 4

Loop 5

Loop 6

Transfer function estimation for loop 1

Transfer function estimation for loop 2

Transfer function estimation for loop 3

Transfer function estimation for loop 4

Transfer function estimation for loop 5

Transfer function estimation for loop 6

METHOD AND ARRANGEMENT FOR A DIGITAL SUBSCRIBER LINE

TECHNICAL FIELD

The present invention relates to digital subscriber line technology and in particular to loop qualification by e.g. using single-ended line testing.

BACKGROUND

Digital subscriber line (DSL) is a modem technology that enables broadband high-speed data services over the telephone network in a cost-effective way. However, the telephone network was originally designed to deliver plain old telephone service (POTS), i.e., narrowband service. Therefore, it is important to evaluate whether a telephone line (loop) is capable of supporting a certain DSL service before its provisioning. This evaluation process is referred to as loop qualification (LQ).

The target of the loop qualification is to estimate the attainable bit rate supported by the loop under test (LUT). In particular, it is desired to achieve efficient qualification methods without dispatching technicians to the customer premise (CP) side. Hence, the development of a loop qualification method based on single-ended line testing (SELT) from the central office (CO) is crucial for consistent mass DSL deployment. The attainable bit rate can be determined if the transfer function as a function of the frequency and the noise profile of the loop are known. The noise profile may be estimated by, e.g., measurements at the CO side and the challenge is hence to estimate the transfer function in order to perform the loop qualification. FIG. 1 illustrates a telephone line being subject to loop qualification. At the central office (CO) side, the measured voltage is denoted $V_1$ and the measured impedance is denoted $Z_{in}$ and at the CP side the measured voltage is denoted $V_2$ and the measured impedance $Z_{out}$.

Usually, the SELT based-methods used to estimate the transfer function rely on a priori knowledge about the LUT topology or on an identification process of it to estimate the loop transfer function posteriori. The transfer function of a subscriber loop may be estimated by means of a one-port scattering parameter measurement at the central office. One of such methods is presented in IEEE Journal on Selected Areas in Communications, 20(5):936-948, June 2002, where parameterized models for a transfer function and scattering parameter $S_{11}$ of three predefined kinds of loop topologies are proposed. The optimum values for these parameters are found through maximum likelihood (ML) estimation, using the $S_{11}$ model of the actual topology and $S_{11}$ measurements to compose the cost-function of the optimization process. The estimated parameters are then applied to the transfer function model in order to estimate the loop transfer function. A method for topology identification using time domain reflectometry (TDR) is described in S. Galli and K. J. Kerpez, Single-ended loop make-up identification-part I: A method of analyzing TDR measurements, IEEE Transactions on Instrumentation and Measurement, 55(2):528-537, April 2006 and in K. J. Kerpez and S. Galli, Single-ended loop-makeup identification-part II: Improved algorithms and performance results, IEEE Transactions on Instrumentation and Measurement, 55(2):538-549, April 2006. The method is based on an iterative de-embedding process where the kinds of discontinuities on the LUT are first identified—using a database, a cable model and the mean squared error criterion—, followed by estimation of the sections length. The approach initially proposed in T. Vermeiren, T. Bostoen, P. Boets, X. Ochoa Chebab, and F. Louage, Subscriber loop topology classification by means of time domain reflectometry, Proceedings of the IEEE International Conference on Communications. ICC '03., volume 3, pages 1998-2002, May 2003 using $S_{11}$ measurements in order to identify the loop topology is done by a set of well-defined phases: a) pre-processing of the measured $S_{11}$ in order to generate its time domain counterpart $S_{11}(t)$ b) extraction of the features of each reflection present on $S_{11}(t)$ c) analyzing the extracted features through a Bayesian network and a rule based system in order to obtain knowledge about the loop topology as described in P. Boets, T. Bostoen, L. Van Biesen, and T. Pollet, Preprocessing of signals for single-ended subscriber line testing. IEEE Transactions on Instrumentation and Measurement, 55(5):1509-1518, October 2006, in Carine Neus, Patrick Boets, and Leo Van Biesen, Transfer function estimation of digital subscriber lines with single ended line testing, Proceedings of the IEEE Instrumentation and Measurement Technology Conference, pages 1-5, May 2007 and in Carine Neus, Patrick Boets, and Leo Van Biesen, Feature extraction of one port scattering parameters for single ended line testing. XVIII IMEKO World Congress, 2006.

The above described SELT based-methods depend on one or more tools like signal processing, Bayesian networks, algorithms to estimate the arrival time of the reflections, and optimization processes. In general, these tools are non-trivial ones and may have limited application in hardware implementation. Such methods also use cable models. Cable models are parametric models for the primary or secondary parameters of a cable section, in accordance to its gauge, and are useful to predict twisted-pair behavior. However, the nominal values (static) provided by a cable model and measurements may present an intrinsic mismatch since the real primary/secondary parameters may vary even from pair to pair of the same cable. This fact may delude methods based on comparison of simulated results and measurements. BT#1, MAR#2 and VUB0 are examples of cable models, and further described in R. F. M. van den Brink. Cable reference models for simulating metallic access networks, ETSI STC. TM6, 1998, J. Musson. Maximum likelihood estimation of the primary parameters of twisted pair cables. ETSI STC, TM6, 1998 and in P. Boets, M. Zekri, L. Van Biesen, T. Bostoen, and T. Pollet, On the identification of cables for metallic access networks, in Proceedings of the 18th IEEE Instrumentation and Measurement Technology Conference, IMTC '01, volume 2, pages 1348-1353, May 2001. Additionally, the estimation of the sections' length takes the mean value of the velocity of propagation (VoP) into account. A typical value is 65% of the speed of light in vacuum. However, strictly speaking, different cables have different velocity of propagation, temperature, age, humidity and other factors can affect the VoP.

As stated above, the transfer function estimation is essential for the LQ process. Based on the transfer function and noise profiles, the bit rate supported by the LUT can be calculated. However, the transfer function can only be measured by means of communication between equipments at both CO and CP side. This can be achieved by letting skilled service staff perform measurements at both the CO and CP sides. This is however costly. For some kinds of DSL applications it is possible to perform these measurements automatically using the transceivers at the CO together with the modem at the CP. However, this implies a working DSL connection which of course does not exist before the DSL deployment.

As the customer wants to know the attainable bit rate before he buys the service, SELT-based loop qualification methods aiming at estimating the loop transfer function are a great challenge for the providers of DSL services.

SUMMARY

The object of the present invention is to achieve a method and an arrangement for single-ended loop estimation of the transfer function of the loop from the CO to the CP wherein no dispatch of a skilled technician at the CP is required.

This is done by assuming that the input impedance of the LUT at the CO side is identical to the input impedance of the LUT at the CP side, and by determining the transfer function by measuring the impedance at the CO side with the loop open at the CP side and with the loop short-circuited at the CP side.

The transfer function is estimated at a CO and the method and the arrangement of the present invention is not dependent on the topology of the loop to be qualified. In the method, a value of the impedance at the CO side is retrieved at the CO when the end of the line at the CP is short circuited and a value of the impedance at the CO is retrieved at the CO side when the end of the line at the CP is open. The transfer function is then estimated based on the retrieved value of the impedance at the CO when the end of the line at the CP is open and based on the retrieved value of the impedance at the CO when the end of the line at the CP is short-circuited under the assumption that the loop to be qualified is symmetric independently of the symmetric characteristics of the loop to be qualified.

According to a second aspect of the present invention, an arrangement for estimating a transfer function at a central office to be used for performing loop qualification of a digital subscriber line between a CO and a CP regardless of the topology of the loop to be qualified is provided. The arrangement comprises retrieving means, e.g. an impedance meter or a DSL transceiver, for retrieving at the CO a value of the impedance at the CO side when the end of the line at the CP is short circuited and retrieving means, e.g. an impedance meter or a DSL transceiver, for retrieving at the CO a value of the impedance at the CO when the end of the line at the CP is open. Further, the arrangement comprises a calculator for estimating the transfer function based on the retrieved value of the impedance at the CO when the end of the line at the CP is open and based on the retrieved value of the impedance at the CO when the end of the line at the CP is short-circuited under the assumption that the loop to be qualified is symmetric independently of the symmetric characteristics of the loop to be qualified.

An advantage with the present invention is that it is an analytic method based on classic theory, making its implementation straightforward in hardware.

A further advantage is that it avoids any previous loop topology identification process to estimate the transfer function.

A further advantage is that it does not depend upon any cable model or any a priori information about the LUT.

A further advantage is that the processing time is negligible since the method is based on simple mathematical calculations.

A further advantage is that it relies only on measurements from the CO although the need of arranging an open-circuit and a short-circuit at the CP side of the loop is still necessary.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

The present invention relates to a method and an arrangement based on two-port network (TPN) theory that allows analytically estimation of the loop transfer function from open and short-circuited input impedance measurements, e.g. SELT measurements, by utilizing the fact that the LUT can be considered reciprocal and by assuming that the LUT is symmetric. Hence, by using the present invention and an estimation of the noise on the line, the attainable bit rate at the customer premises can be determined by means of SELT measurements at the CO.

The transfer function of a telephone copper-loop is estimated regardless of its topology by impedance measurements from the CO side. Specifically, such estimation is carried out from the calculation of the transmission parameters of loop, which are expressed only in terms of open and short-circuited input impedance measurements at the CO when reciprocity and symmetry is assumed. These impedance measurements may be performed by little or no arrangements at the CP side according to an embodiment of the present invention.

Figure 1:
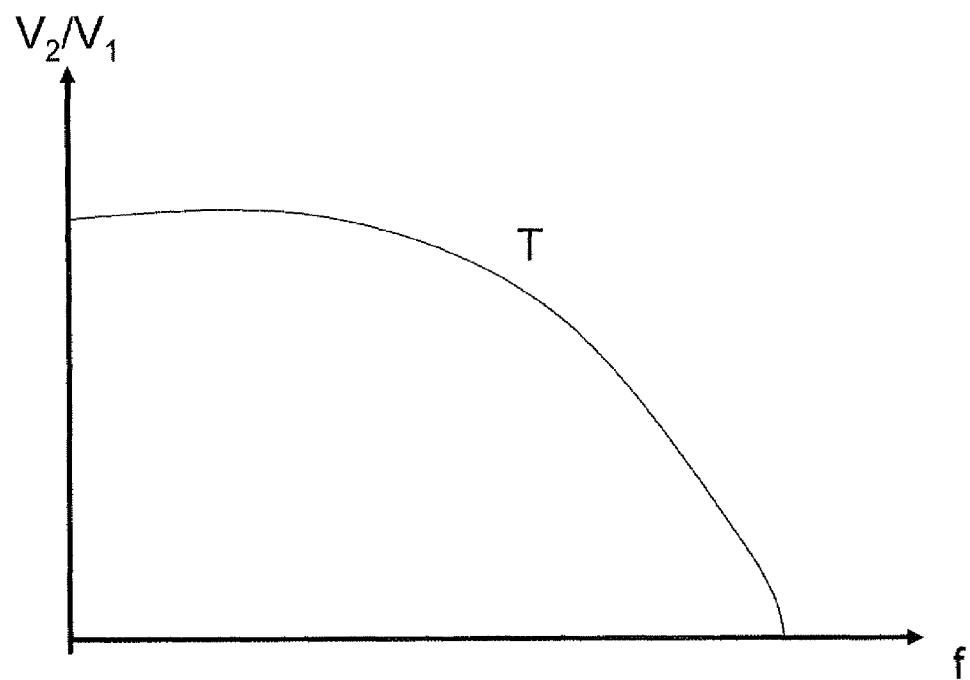
FIG. 1 illustrates a telephone line and its associated transfer function.
Figure 1:
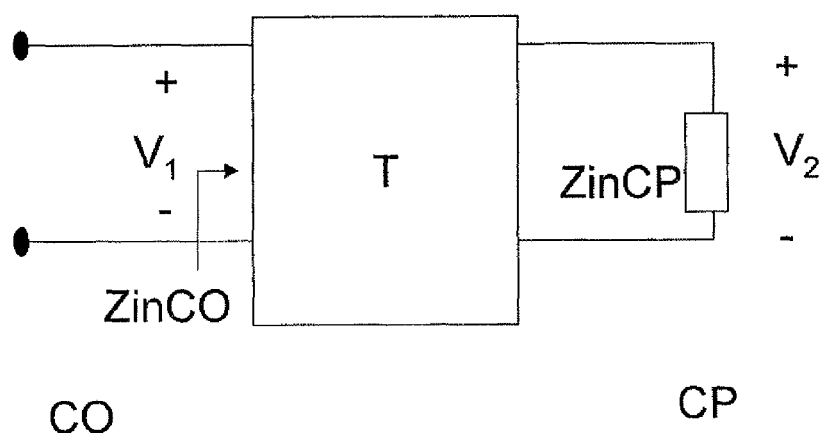
Figure 2:
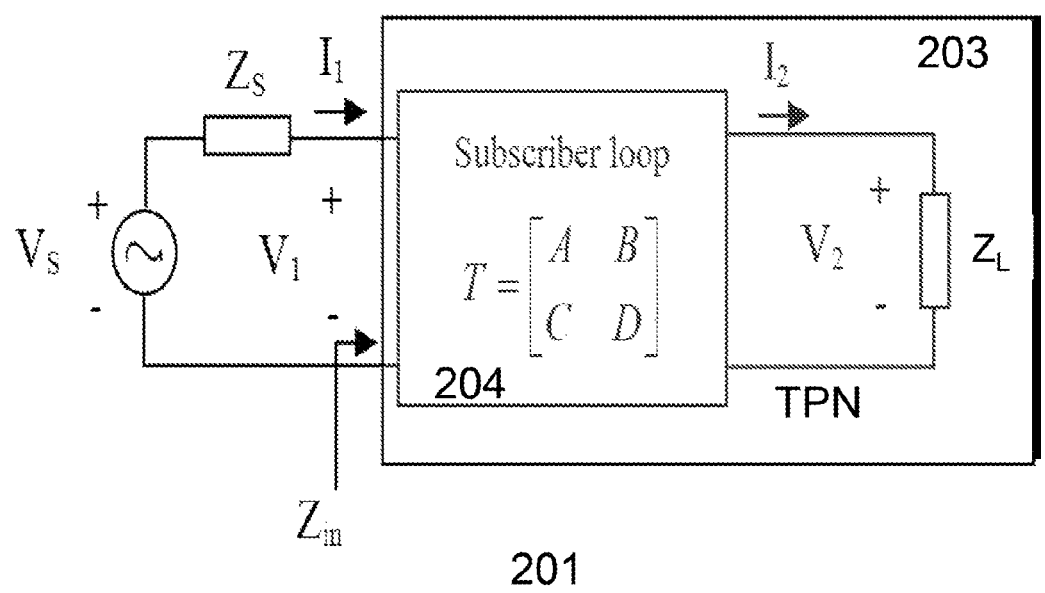
FIG. 2 illustrates a model of telephone line connecting the customer premises to a central office according to embodiments of the present invention.

In this way, the line (network) 201 connecting the CP to the CO is modeled as depicted in FIG. 2. The voltage source $V_S$ with the internal impedance $Z_S$ represents the measuring equipment 202 located at the CO, the TPN represents the loop 201 itself, and the load impedance $Z_L$ represents the loop termination 203 at the CP. FIG. 2 also illustrates an example of the transfer function 204 to be estimated. As stated above, under the assumption that the network 201 can be considered reciprocal and symmetric its transmission matrix $$T = \begin{bmatrix} A B \\ C D \end{bmatrix}$$

can be estimated with impedance measurements performed from just one end of such network. As the transfer function of the TPN can be derived from its transmission matrix T it follows that the transfer function of a telephone copper loop can be estimated by just measuring the input impedance of the loop at the CO side.

In the following the transmission matrix that models the LUT is derived and expressed in terms of the impedance measured with the loop open (i.e., $Z_L = \infty$) and short-circuited (i.e., $Z_L = 0$). The frequency dependency of the transmission parameters that compose the transmission matrix will be omitted for convenience.

The input impedance at the input port of the loop, $Z_{in1}$, can be expressed in terms of the transmission parameters of the loop and the load impedance as follows:

$$Z_{in1} = \frac{AZ_L + B}{CZ_L + D}. \quad (1)$$

Whenever no load or a high impedance load is connected to the loop's output port (i.e., $Z_L = \infty$), Equation (1) is reduced to $$Z_{in1}^\infty = \frac{A}{C}. \quad (2)$$

In the same way, whenever a short circuit or a low impedance load is connected to the loop's output port (i.e., $Z_L = 0$), Equation (1) is reduced to $$Z_{in1}^0 = \frac{B}{D}. \quad (3)$$

Two properties of the loop are of importance for the analysis: reciprocity and symmetry. Reciprocity regards to voltage and current at different ports of the LUT, being one the excitation while the other is the response to the excitation. In this way, the reciprocity of a TPN is determined by its transfer impedances. Whenever they are equal to each other, the TPN is reciprocal. In terms of transmission parameters, this may be expressed by $$AD - BC = f_r, \quad (4)$$

where $f_r$ is the resultant frequency-dependent vector of the determinant of the transmission matrix that models the TPN and symbolizes the reciprocity level of the TPN. For convenience, it will be called reciprocity factor throughout this document. Whenever the reciprocity factor is constant over the frequency and equal to 1, the TPN is said to be reciprocal. On the other hand, symmetry is determined by the impedance of the ports of the TPN. Whenever they are equal to each other, the TPN is symmetrical ($z_{11} = z_{22}$, using the terminology for impedance parameters). In terms of transmission parameters, this may be expressed by $$f_s^2 = \frac{A}{D}, \quad (5)$$

where $f_s$ is the resultant frequency-dependent vector of the square root of the ratio between transmission parameter A and transmission parameter D, and symbolizes the symmetry level of the TPN. For convenience, it will be called symmetry factor throughout this document. Whenever the symmetry factor is constant over the frequency and equal to 1, the TPN is said to be symmetrical.

Applying Equations (3) and (5) to Equation (4) results in $$\frac{A^2}{f_s^2} - Z_{in1}^0 \frac{A^2}{f_s^2} C = f_r, \quad (6)$$

In this way, if Equation (2) is applied to Equation (6), the transmission parameter C can be expressed by $$C = \sqrt{\frac{f_r f_s^2}{Z_{in1}^\infty (Z_{in1}^\infty - Z_{in1}^0)}}. \quad (7)$$

Applying Equation (7) to Equation (2), the transmission parameter A can be expressed by $$A = \sqrt{\frac{Z_{in1}^\infty f_r f_s^2}{Z_{in1}^\infty - Z_{in1}^0}}. \quad (8)$$

Now, if Equation (8) is applied to Equation (5), the transmission parameter D can be expressed by $$D = \sqrt{\frac{Z_{in1}^\infty f_r}{(Z_{in1}^\infty - Z_{in1}^0) f_s^2}}. \quad (9)$$

Finally, applying Equation (9) to Equation (3), the transmission parameter B can be expressed by $$B = \sqrt{\frac{Z_{in1}^\infty {Z_{in1}^0}^2 f_r}{(Z_{in1}^\infty - Z_{in1}^0) f_s^2}}. \quad (10)$$

Consequently, the transmission matrix T that characterizes the loop as a whole is given by $$T = \begin{bmatrix} A & B \\ C & D \end{bmatrix} \quad (11)$$

$$= \begin{bmatrix} \sqrt{\dfrac{Z_{in1}^\infty f_r f_s^2}{Z_{in1}^\infty - Z_{in1}^0}} & \sqrt{\dfrac{Z_{in1}^\infty {Z_{in1}^0}^2 f_r}{(Z_{in1}^\infty - Z_{in1}^0) f_s^2}} \\ \sqrt{\dfrac{f_r f_s^2}{Z_{in1}^\infty (Z_{in1}^\infty - Z_{in1}^0)}} & \sqrt{\dfrac{Z_{in1}^\infty f_r}{(Z_{in1}^\infty - Z_{in1}^0) f_s^2}} \end{bmatrix}.$$

It is important to point out that Equation (11) completely characterizes not only telephone lines but any network modelled as a TPN as well, and does not restrict the analysis to any frequency band in special.

Now, the transfer function is derived.

By definition from the ABCD matrix:

$$\begin{bmatrix} V_1 \\ I_1 \end{bmatrix} = \begin{bmatrix} A & B \\ C & D \end{bmatrix} \begin{bmatrix} V_2 \\ I_2 \end{bmatrix} \quad (12)$$

From FIG. 2 it can be concluded that $$V_2 = I_2 Z_L \quad (13)$$

and $$V_S = I_1 Z_S + V_1. \quad (14)$$

The transfer function, H, can be written $$H = \frac{V_2}{V_S} = \frac{V_2}{V_1}\frac{V_1}{V_S} = \frac{V_2}{V_1}\frac{Z_{in}}{Z_{in}+Z_S} \quad (15)$$

The first row of the matrix equation (12) can be written as $$V_1 = AV_2 + BI_2 = AV_2 + B\frac{V_2}{Z_L}, \quad (16)$$

where the last step is achieved with the aid of equation (13).

Solving for $V_2/V_1$ in (16) gives $$\frac{V_2}{V_1} = \frac{Z_L}{AZ_L+B}. \quad (17)$$

As stated before, the input impedance can be written $$Z_{in} = \frac{V_1}{I_1} = \frac{AV_2+BI_2}{CV_2+DI_2} = \frac{AV_2+BV_2/Z_L}{CV_2+DV_2/Z_L} = \frac{AZ_L+B}{CZ_L+D}, \quad (18)$$

where equation (13) has been used to substitute $I_2$, the third equivalence, where after $V_2$ is eliminated.

Now applying (17) and (18) into the last expression of (15) and extending the result with $(CZ_L+D)$ results in that the transfer function H can be expressed as $$H = \frac{Z_L}{AZ_L+B+CZ_SZ_L+DZ_S}. \quad (19)$$

It has now been shown that the transfer function can be determined by retrieving measurements on the impedance at the CO side measured with the loop open (i.e., $Z_L=\infty$) and short-circuited (i.e., $Z_L=0$) by using Equation (11). The fact that the impedance measurements must be performed with the loop open and with the loop short circuited may demand some action on the CP side. This could be performed by an unskilled technician or by the customer.

Referring to the statement above that the loop in reciprocal, this will now be shown by the following example. A circuit containing resistors, inductors, capacitors and transformers but no dependent sources or independent sources is a reciprocal network [Raymond A. DeCarlo, Pen-Min Lin, *Linear Circuit Analysis*, Oxford University Press, 2001]. As a copper loop can be modeled in such a way it is a reciprocal network. Thus the determinant of the transmission matrix T that models a reciprocal line section is always unitary, according to Equation (4). Moreover, it is well-known that the determinant of a product of square matrices is equal to the product of the determinant of each square matrix, i.e., $$\det(T_1 \times T_2 \times T_3 \times \ldots) = \det(T_1) \times \det(T_2) \times \det(T_3) \times \ldots \quad (22)$$

Those properties indicate that a loop made by a cascade of reciprocal sections is a reciprocal loop. Therefore, it is straightforward to conclude that any telephone loop, no matter how many sections it has, can be considered a reciprocal loop, i.e., the determinant of its transmission matrix T will always satisfy the expression $AD-BC=f_r=1$. It implies that the transmission matrix T that completely characterizes any telephone loop can be expressed by the following reduced version of Equation (11):

$$T = \begin{bmatrix} A & B \\ C & D \end{bmatrix} \quad (23)$$

$$= \begin{bmatrix} \sqrt{\dfrac{Z_{in1}^\infty f_s^2}{Z_{in1}^\infty - Z_{in1}^0}} & \sqrt{\dfrac{Z_{in1}^\infty {Z_{in1}^0}^2}{(Z_{in1}^\infty - Z_{in1}^0)f_s^2}} \\ \sqrt{\dfrac{f_s^2}{Z_{in1}^\infty(Z_{in1}^\infty - Z_{in1}^0)}} & \sqrt{\dfrac{Z_{in1}^\infty}{(Z_{in1}^\infty - Z_{in1}^0)f_s^2}} \end{bmatrix}.$$

As stated above, the loop is also assumed to be symmetric i.e., $f_s$ is set to 1 according to the present invention even if the loop in the reality is not symmetric. From this, the transmission matrix that T that completely characterizes any telephone loop can expressed only by impedance measurements conducted at CO side.

Figure 5:
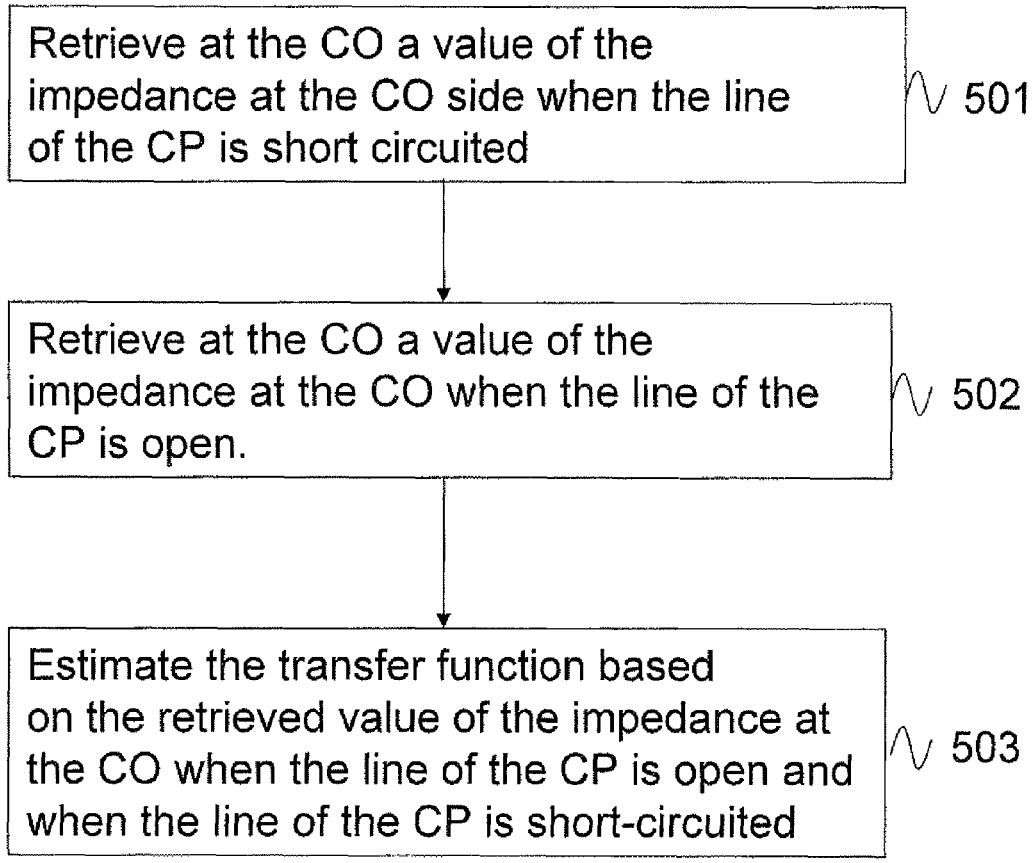
FIG. 5 is a flowchart illustrating a method according to an embodiment of the present invention.

Hence, a method for estimating a transfer function at a central office to be used for performing loop qualification of a digital subscriber line between a central office and a customer premises regardless of the topology of the loop to be qualified is provided as illustrated in FIG. 5. The method comprises the steps of:

501. Retrieve at the CO a value of the impedance at the CO side when the end of the line at the CP is short circuited.

502. Retrieve at the CO a value of the impedance at the CO when the end of the line at the CP is open.

503. Estimate the transfer function based on the retrieved value of the impedance at the CO when the end of the line at the CP is open and based on the retrieved value of the impedance at the CO when the end of the line at the CP is short-circuited under the assumption that the loop to be qualified is symmetric independently of the symmetric characteristics of the loop to be qualified.

Figure 6:
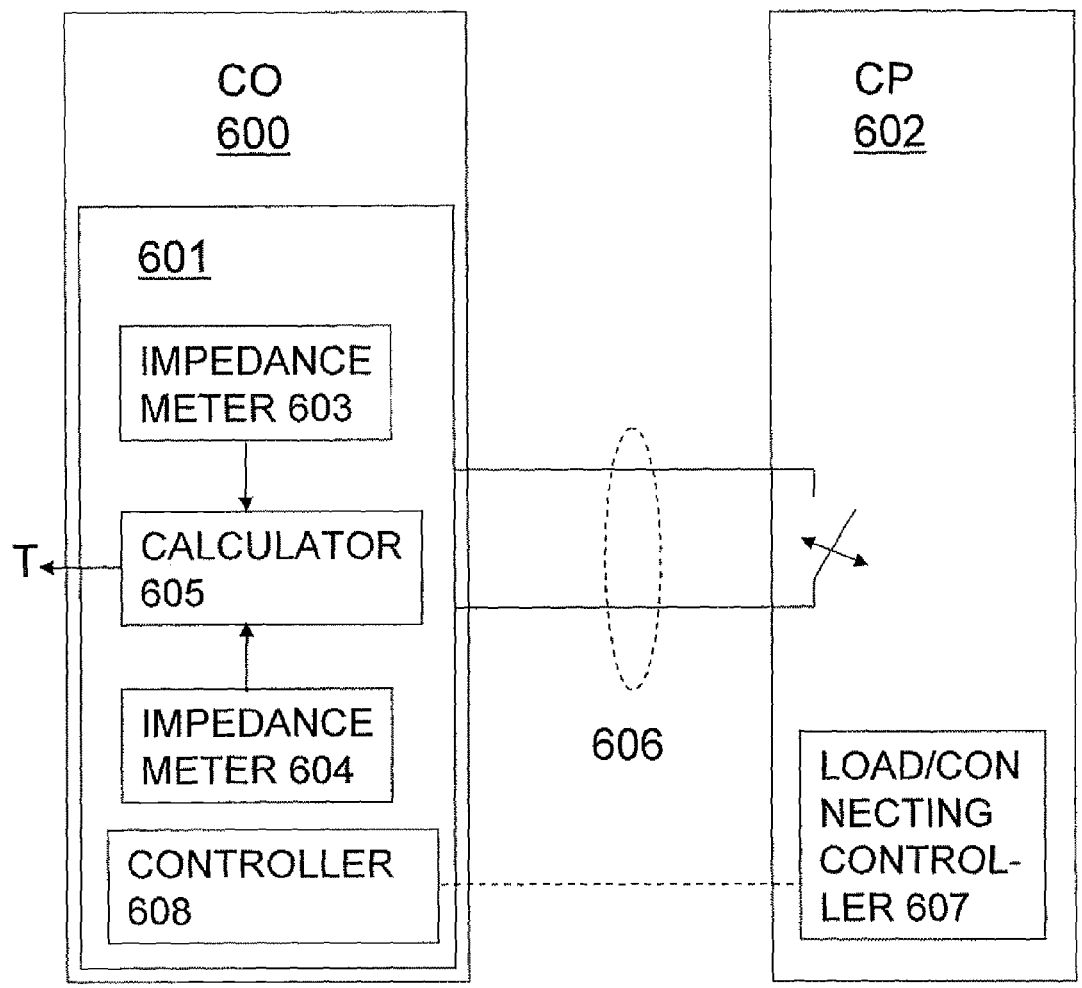
FIG. 6 illustrates the arrangement according to an embodiment of the present invention.

Accordingly, an arrangement 601 in association with a central office 600 for estimating the transfer function be used for performing loop qualification of the digital subscriber line 606 between the central office and the customer premises 602 regardless of the topology of the loop 606 to be qualified is provided. The arrangement comprises as illustrated in FIG. 6 retrieving means 603 for retrieving at the CO 600 a value of the impedance at the CO 600 side when the end of the line 606 at the CP 602 is short circuited, retrieving means 604 for retrieving at the CO a value of the impedance at the CO 600 when the end of the line 606 at the CP 602 is open and a calculator 605 for estimating the transfer function based on the retrieved value of the impedance at the CO 600 when the end of the line 606 at the CP 602 s open and based on the retrieved value of the impedance at the CO 600 when the end of the line 606 at the CP 602 is short-circuited under the assumption that the loop 606 to be qualified is symmetric independently of the symmetric characteristics of the loop 606 to be qualified.

The retrieved value of the impedance at the CO side when the end of the line at the CP is short circuited may be retrieved by means of a SELT based method and also the retrieved value of the impedance at the CO side when the end of the line of the CP is open may be retrieved by means of a SELT based method. In this case someone, e.g. the customer himself, at the customer premises needs to open and short-circuited the line at the CP side.

According to a further embodiment, an arrangement 607 for automatically changing the load impedance at the CP side is provided: To simplify the measurements of the impedances at the CO an apparatus 607 to be connected at the CP side of the line with the purpose of arranging an open line and shorted line can be sent to the customer. These apparatuses 607 can be designed to be controlled with a controller 608 from the CO.

To evaluate the present invention, input impedance and transfer function measurements were obtained from a measurement campaign performed with some Ericsson cables with dedicated measurement instruments. Six test loops were used and they are described by FIG. 3, which is further explained below.

The estimations of the transfer functions, based on impedance measurements, were compared with direct measurements of the corresponding transfer functions.

As previously stated, loop symmetry was assumed during the calculation of the transmission parameters of the loops, i.e., the Equation (21) taking into account $f_s=1$ was used on such calculations.

The figure of merit used to evaluate the estimated curves was the difference between the magnitudes in dB of the measured and estimated transfer functions. The maximum acceptable value for the figure of merit was defined as 2 dB per tone (frequency sample of the curve). For the bit loading process on each tone, an error on transfer function estimation about 3 dB means one lost bit (explanation about this relationship is further explained in Ed. Philip Golden, Herve Dedieu and Krista S. Jacobsen, Fundamentals of DSL Technology, Auerbach Publications, 2006.

Figure 3B:
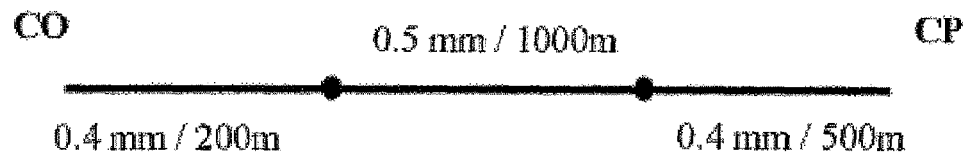
FIG. 3 illustrates the topology of test loops 1-6 used to evaluate the present invention.
Figure 3B:
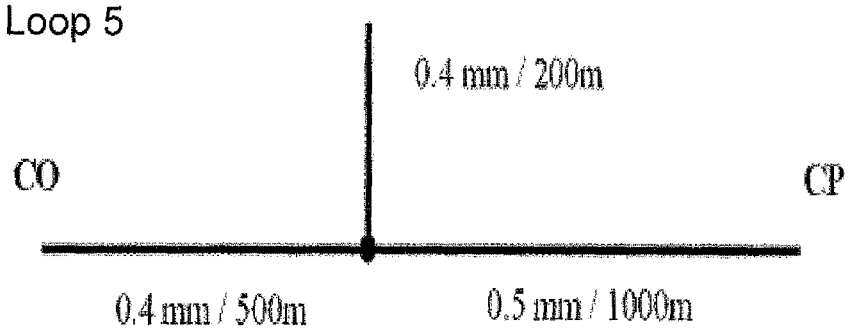
Figure 3B:
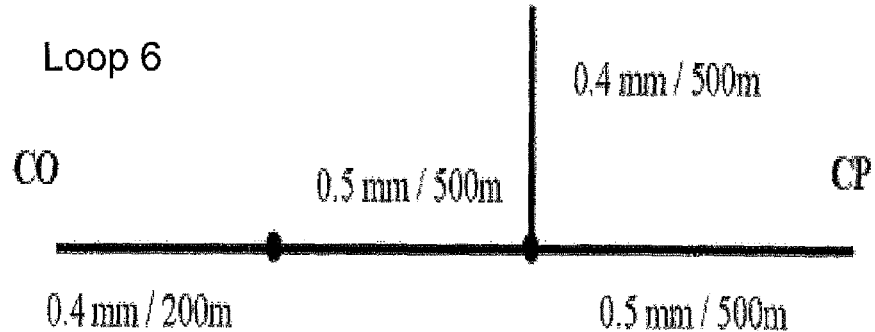
Figure 4A:
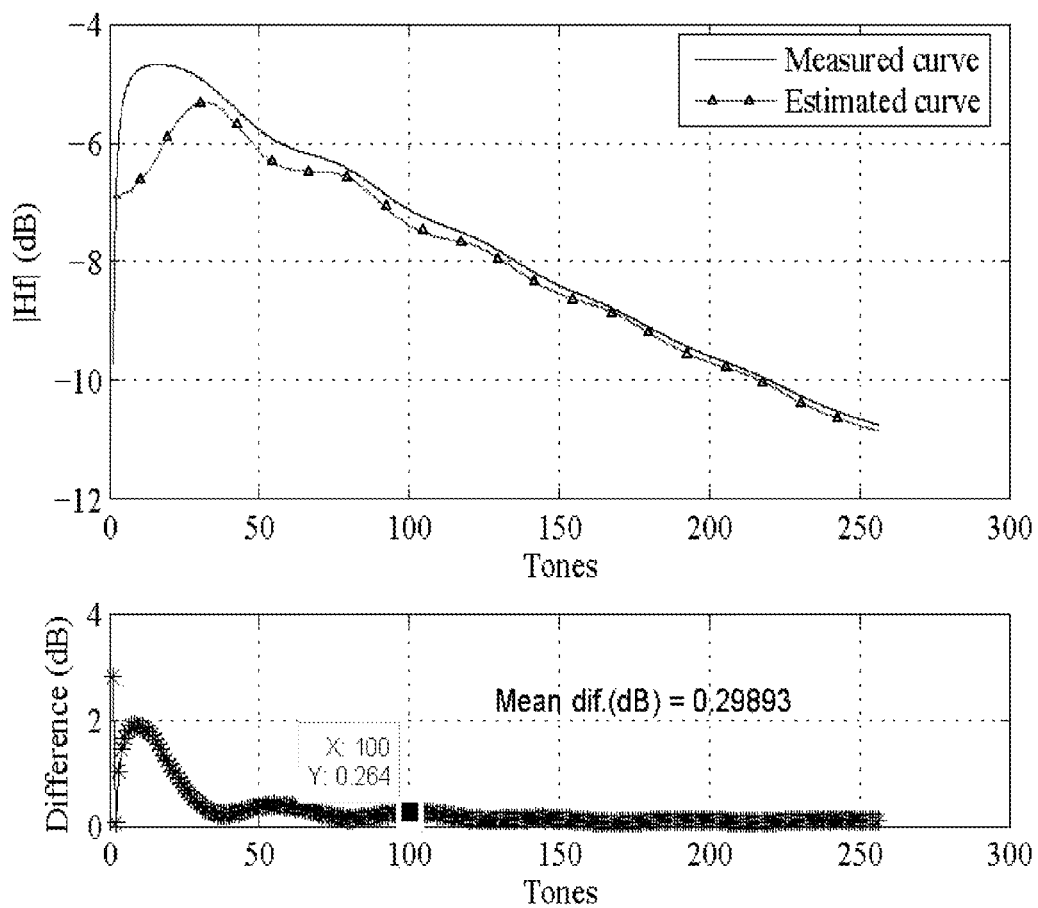
FIG. 4 shows graphs illustrating the performance of the present invention using the loop topologies of FIG. 3.
Figure 4B:
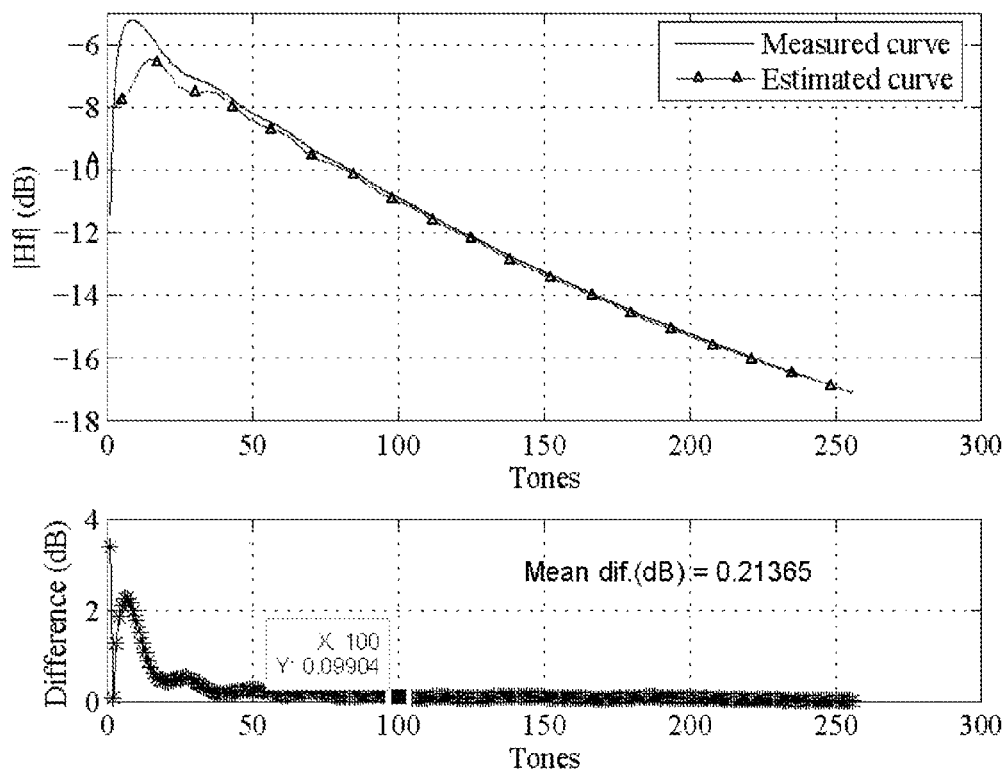
Figure 4C:
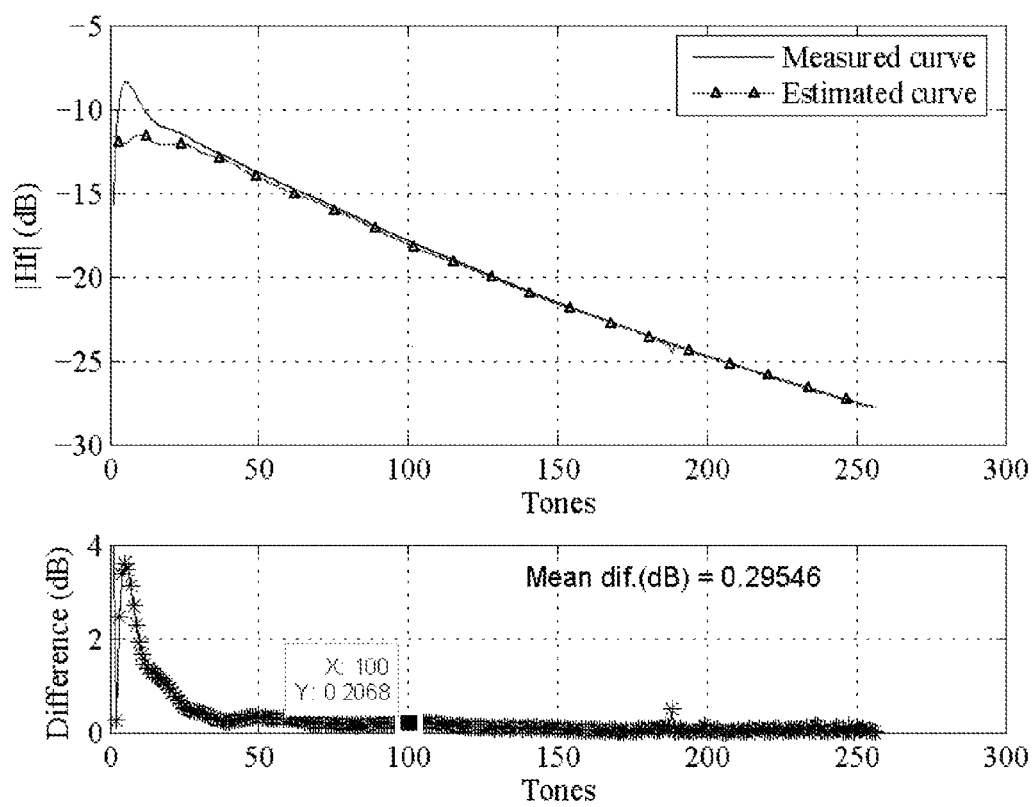
Figure 4D:
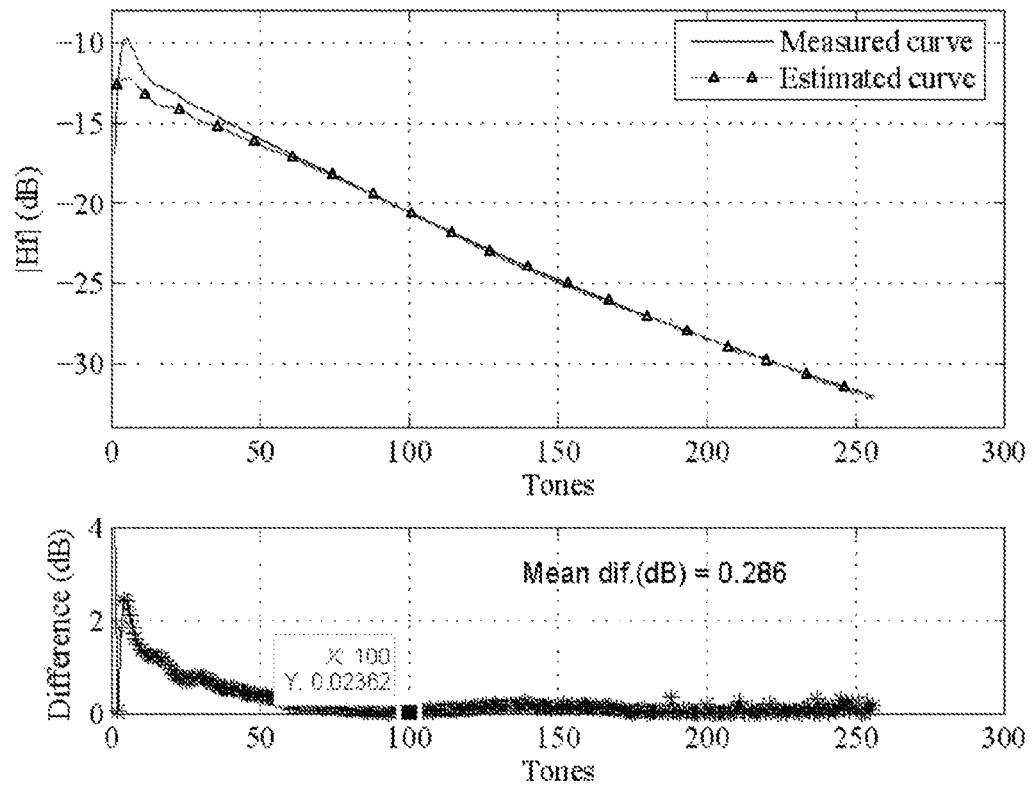
Figure 4E:
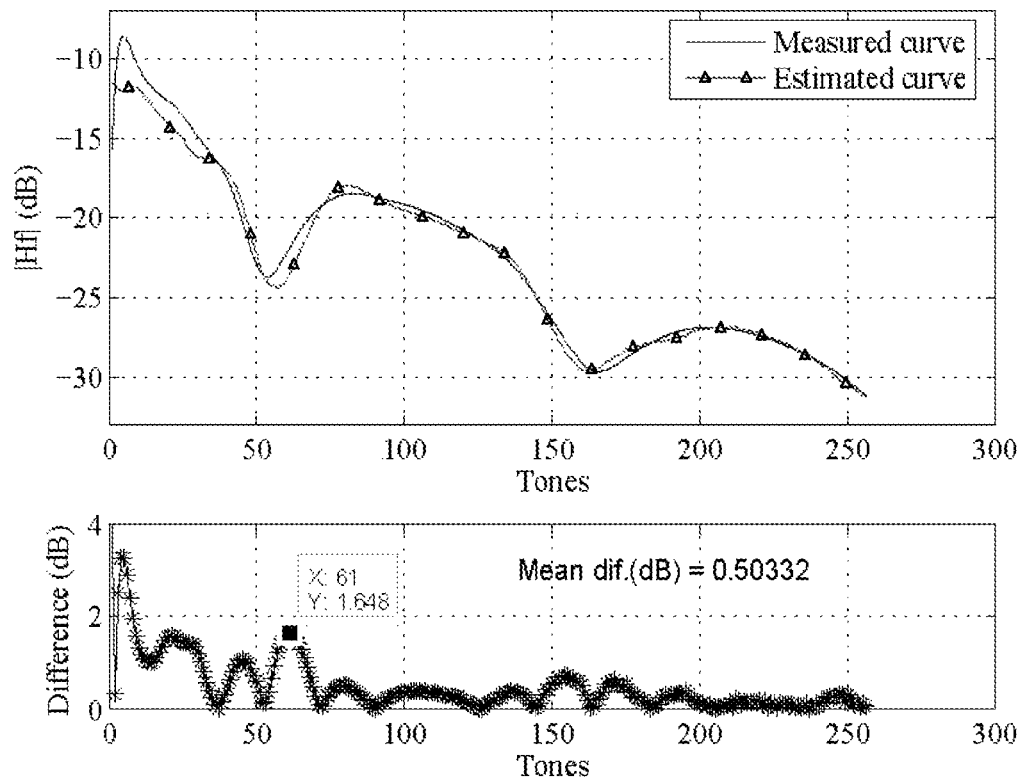
Figure 4F:
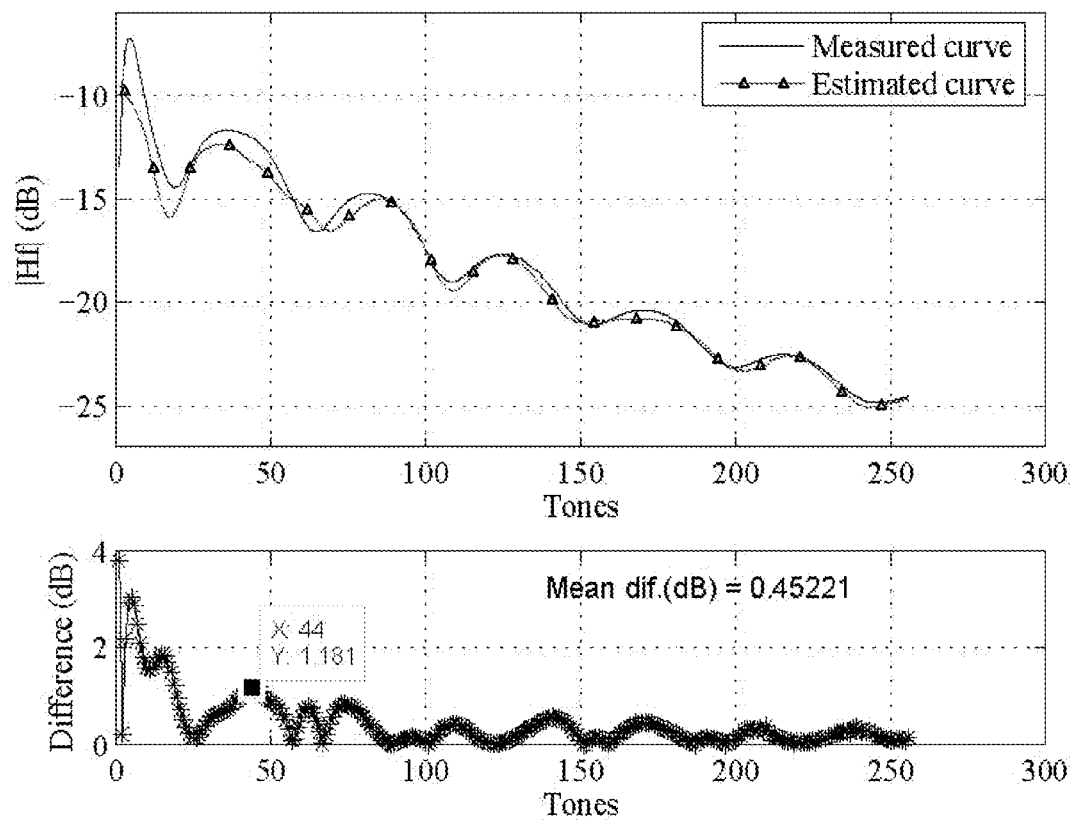

FIG. 3 shows:
the topology of loop 1 having a diameter of 0.4 mm and a length of 500 m,
the topology of loop 2 having a diameter of 0.5 mm and a length of 1000 m,
the topology of loop 3 having a first section with a diameter of 0.4 mm and a length of 500 m and a second section with a diameter of 0.5 mm and a length of 1000 m,
the topology of loop 4 having a first section with a diameter of 0.4 mm and a length of 200 m, a second section with a diameter of 0.5 mm and a length of 1000 m, and a third section with a diameter of 0.4 mm and a length of 500 m,
the topology of loop 5 having a first section with a diameter of 0.4 mm and a length of 500 m, a second section with a diameter of 0.5 mm and a length of 1000 m, and a third section extending as a branch between the first and the second sections (bridged-tap) with a diameter of 0.4 mm and a length of 200 m, and
the topology of loop 6 having a first section with a diameter of 0.4 mm and a length of 200 m, a second section with a diameter of 0.5 mm and a length of 500 m, a third section with a diameter of 0.5 mm and a length of 500 m and a fourth section extending as a branch between the second and the third sections (bridged-tap) with a diameter of 0.4 mm and a length of 500 m.

The results are presented in the plots of FIG. 4.

FIG. 4 shows:
the measured transfer function and its estimate from the disclosed invention for the test loop 1,
the measured transfer function and its estimate from the disclosed invention for the test loop 2,
the measured transfer function and its estimate from the disclosed invention for the test loop 3,
the measured transfer function and its estimate from the disclosed invention for the test loop 4,
the measured transfer function and its estimate from the disclosed invention for the test loop 5, and
the measured transfer function and its estimate from the disclosed invention for the test loop 6.

The dashed black curves in magnitude subplots represent the estimated transfer function curves for the respective loop under test while the continuous black curves represent the measured transfer function curves;

The black curves with star markers in deviation subplots represent the deviation (difference) between the magnitudes in dB of the measured transfer function curve and the estimated one for the respective loop under test.

When studying the plots of FIGS. 4*a*-4*f*, it can be noted that the estimated transfer function, estimated by using the present invention, substantially follows the measured transfer function. Thus, the conclusion is that the method and arrangement provide a reliable result.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for estimating a transfer function at a central office (CO) to be used for performing loop qualification of a digital subscriber line between the CO, and a customer premises (CP) regardless of the topology of the loop to be qualified, the method comprising the steps of:
retrieving at the CO a value $Z_{in1}^0$ of the impedance at the CO side when the end of the line at the CP is short circuited,
retrieving at the CO a value $Z_{in1}^\infty$ of the impedance at the CO when the end of the line at the CP is open and
estimating, using a calculator, the transfer function based on a transmission matrix T expressed by the following equation:

$$T = \begin{bmatrix} \sqrt{\dfrac{Z_{in1}^\infty f_s^2}{Z_{in1}^\infty - Z_{in1}^0}} & \sqrt{\dfrac{Z_{in1}^\infty Z_{in1}^{02}}{(Z_{in1}^\infty - Z_{in1}^0)f_s^2}} \\ \sqrt{\dfrac{f_s^2}{Z_{in1}^\infty(Z_{in1}^\infty - Z_{in1}^0)}} & \sqrt{\dfrac{Z_{in1}^\infty}{(Z_{in1}^\infty - Z_{in1}^0)f_s^2}} \end{bmatrix}$$

wherein $f_s$ is set to 1 under the assumption that an impedance of the ports of the loop are equal to each other such that the loop to be qualified is assumed to be symmetric independently of the symmetric characteristics of the loop to be qualified.

2. The method according to claim 1, wherein the retrieved value of the impedance at the CO side, when the end of the line at the CP is short circuited, is retrieved by means of a single-ended line testing (SELT) based method.

3. The method according to claim 1, wherein the retrieved value of the impedance at the CO side, when the end of the line at the CP is open, is retrieved by means of a single-ended line testing (SELT) based method.

4. An arrangement for estimating a transfer function at a central office to be used for performing loop qualification of a digital subscriber line between the central office (CO) and a customer premises (CP) regardless of the topology of the loop to be qualified, the arrangement comprising:
retrieving means for retrieving at the CO a value $Z_{in1}^0$ of the impedance at the CO side when the end of the line at the CP is short circuited, retrieving means for retrieving at the CO a value $Z_{in1}^{\infty}$ of the impedance at the CO when the end of the line at the CP is open and a calculator for estimating the transfer function based on a transmission matrix T expressed by the following equation:

$$T = \begin{bmatrix} \sqrt{\dfrac{Z_{in1}^{\infty} f_s^2}{Z_{in1}^{\infty} - Z_{in1}^{0}}} & \sqrt{\dfrac{Z_{in1}^{\infty} Z_{in1}^{02}}{(Z_{in1}^{\infty} - Z_{in1}^{0}) f_s^2}} \\ \sqrt{\dfrac{f_s^2}{Z_{in1}^{\infty}(Z_{in1}^{\infty} - Z_{in1}^{0})}} & \sqrt{\dfrac{Z_{in1}^{\infty}}{(Z_{in1}^{\infty} - Z_{in1}^{0}) f_s^2}} \end{bmatrix}$$

wherein $f_S$ is set to 1 under the assumption that an impedance of the ports of the loop are equal to each other such that the loop to be qualified is assumed to be symmetric independently of the symmetric characteristics of the loop to be qualified.

5. The arrangement according to claim 4, wherein the retrieved value of the impedance at the CO side, when the end of the line at the CP is short circuited, is retrieved by means of a single-ended line testing (SELT) based method.

6. The arrangement according to claim 4 wherein the retrieved value of the impedance at the CO side when the end of the line at the CP is open is retrieved by means of a single-ended line testing (SELT) based method.

7. The arrangement according to claim 4 further comprising a controller for controlling an arrangement at the CP side for automatically changing the load impedance at the CP side.

8. The arrangement according to claim 4 further comprising a controller for controlling an arrangement at the CP side for arranging an open line and a short circuited line.

* * * * *

UNITED STATES PATENT AND TRADEMARK OFFICE
CERTIFICATE OF CORRECTION

PATENT NO. : 8,798,946 B2  
APPLICATION NO. : 13/060928  
DATED : August 5, 2014  
INVENTOR(S) : Ericson et al.

Page 1 of 1

It is certified that error appears in the above-identified patent and that said Letters Patent is hereby corrected as shown below:

On the Title Page

Item (75), under "Inventors", in Column 1, Line 1, delete "Alvsjo" and insert -- Älvsjö --, therefor.

Item (75), under "Inventors", in Column 1, Line 2, delete "Belem" and insert -- Belém --, therefor.

Item (75), under "Inventors", in Column 1, Line 3, delete "Belem" and insert -- Belém --, therefor.

Item (75), under "Inventors", in Column 1, Line 4, delete "Belem" and insert -- Belém --, therefor.

In the Claims

In Column 10, Line 33, in Claim 1, delete " $Z_{in1}^{0}$ " and insert -- $Z_{in1}^{\infty}$ --, therefor.

In Column 12, Line 8, in Claim 6, delete "4" and insert -- 4, --, therefor.

In Column 12, Line 9, in Claim 6, delete "side" and insert -- side, --, therefor.

In Column 12, Line 10, in Claim 6, delete "open" and insert -- open, --, therefor.

Signed and Sealed this  
Second Day of June, 2015

Michelle K. Lee  
*Director of the United States Patent and Trademark Office*